United States Patent
Chen et al.

(10) Patent No.: US 11,648,530 B2
(45) Date of Patent: May 16, 2023

(54) CHIRAL STATIONARY PHASE

(71) Applicant: NANKAI UNIVERSITY, Tianjin (CN)

(72) Inventors: Yao Chen, Tianjin (CN); Zhenjie Zhang, Tianjin (CN); Sainan Zhang, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 360 days.

(21) Appl. No.: 16/960,051

(22) PCT Filed: Dec. 29, 2018

(86) PCT No.: PCT/CN2018/125148
§ 371 (c)(1),
(2) Date: Jul. 3, 2020

(87) PCT Pub. No.: WO2019/137251
PCT Pub. Date: Jul. 18, 2019

(65) Prior Publication Data
US 2021/0023528 A1 Jan. 28, 2021

(30) Foreign Application Priority Data

Jan. 11, 2018 (CN) .................. 201810027487.0
Dec. 25, 2018 (CN) .................. 201811588586.2

(51) Int. Cl.
| | | |
|---|---|---|
| *B01J 20/24* | (2006.01) | |
| *B01J 20/22* | (2006.01) | |
| *B01J 20/28* | (2006.01) | |
| *B01J 20/29* | (2006.01) | |
| *B01J 20/32* | (2006.01) | |
| *B01D 15/38* | (2006.01) | |

(52) U.S. Cl.
CPC .......... *B01J 20/24* (2013.01); *B01D 15/3833* (2013.01); *B01J 20/226* (2013.01); *B01J 20/2808* (2013.01); *B01J 20/28083* (2013.01); *B01J 20/29* (2013.01); *B01J 20/3206* (2013.01); *B01J 20/3217* (2013.01); *B01J 20/3274* (2013.01); *B01J 2220/52* (2013.01)

(58) Field of Classification Search
CPC ...... B01J 20/24; B01J 20/226; B01J 20/2808; B01J 20/28083; B01J 20/29; B01J 20/3206; B01J 20/3217; B01J 20/3274; B01J 2220/52; B01D 15/3833
USPC ....................................................... 502/403
See application file for complete search history.

(56) References Cited

U.S. PATENT DOCUMENTS

2012/0226054 A1    9/2012   Miller et al.

FOREIGN PATENT DOCUMENTS

| CN | 1556729 A | 12/2004 |
|---|---|---|
| CN | 103331151 A | 10/2013 |
| CN | 107096258 A | 8/2017 |
| CN | 107362785 A | 11/2017 |
| WO | 2009149381 A2 | 12/2009 |

*Primary Examiner* — Edward M Johnson (57) ABSTRACT

A chiral stationary phase comprises a porous framework material and biomolecules. The porous framework material includes one of the metal-organic framework (MOF) material, the covalent organic framework (COF) material and the hydrogen-bonded organic framework (HOF) material. The biomolecules are biological chiral resolving agents. A pore size of the porous framework material is 0.2-15 nm. The porous framework material serves as a solid carrier. The biomolecules are loaded into the porous framework material. The porous framework material is modified with one or more of carboxyl, hydroxyl, amino, aldehyde, double bonds and mercapto groups.

11 Claims, 11 Drawing Sheets

CHIRAL STATIONARY PHASE

RELATED APPLICATIONS

The present application is a national phase application of the International Application PCT/CN2018/125148 filed Dec. 29, 2018, which claims the benefit of the Chinese Patent Applications CN201810027487.0 filed Jan. 11, 2018 and CN201811588586.2 filed Dec. 25, 2018, each of which is incorporated herein by reference in its entirety.

FIELD OF THE INVENTION

The present invention relates to the field of chromatographic chiral separation. More particularly, this invention describes the preparation of a variety of composite novel chiral stationary phases with porous framework materials as carriers and biological molecules with natural chiral units as chiral resolution agents, which are suitable for high-performance liquid chromatography (HPLC), gas chromatography (GC), capillary electrophoresis (CE) and other chromatographic separation methods.

BACKGROUND OF THE INVENTION

In nature, chirality is common. Biological macromolecules, including proteins, nucleic acids, enzymes, etc., many kinds of drugs and foods have chiral structures. Generally, there are two corresponding isomers of chiral compounds, which are almost identical in physical and chemical properties. However, there are significant differences in biological activity, metabolic process and toxicity of enantiomers with different optical activity. Therefore, how to obtain the isomer with single configuration and high biological activity is the research focus of chromatographic chiral separation.

At present, chromatography is the most common method for enantiomeric separation, including gas chromatography (GC), high-performance liquid chromatography (HPLC), capillary electrophoresis (CE) and the like. For various chromatographic methods, chromatographic column is the heart of chromatograph, and the separation material (stationary phase) filled in chromatographic column is the key for realizing separation. Therefore, high-performance chromatographic column packing is one of the most abundant and creative fields in chromatographic research. The Chiral Stationary Phases (CSP) that filled in chiral column, usually prepared by the materials with chiral recognition and separation ability (chiral separation agent) loaded on the carrier by chemical bonding or physical coating, mainly including polysaccharide derivative CSP, macrocyclic antibiotic CSP, protein CSP, cyclodextrin CSP, ligand exchange CSP, brush CSP, etc. In which, the first four chiral stationary phases are commonly used in various chromatographic separation methods, and suitable chiral stationary phases can be selected according to the type and nature of the analytes, so as to achieve different separation effects. The performance of the carrier used for loading chiral separation agent has a great influence on the separation effect of CSP. The ideal carrier should have the performance of high loading capacity, difficulty to leak the loaded chiral separation agent, high stability and high applicability (can be used to load different types of chiral separation agents) etc.

Nowadays, owing to the advantages of high surface area, adjustable pore sizes, diverse structures, easiness in modification, excellent thermal and chemical stability, the emerging functional porous framework materials (such as metal organic frameworks, MOFs; covalent organic frameworks, COFs; hydrogen bonded organic frameworks, HOFs) have developed rapidly in the fields of gas adsorption and separation, sensors and catalysis, etc. However, there is no report about its application in chiral stationary phase carrier. In order to overcome the application limitations of traditional chiral chromatographic stationary phase materials, such as poor stability, low loading rate and easy leakage of chiral resolution agent and the like, the high-performance chiral stationary phases (CSP) were prepared in this invention. The porous framework materials were creatively selected and designed, with the characteristic of easiness in modification, high stability, high surface area, porosity and the like, as the chiral stationary phase carrier to immobilize chiral separation agents (such as proteins, enzymes, macrocyclic antibiotics, etc.) via chemical bonding, adsorption, embedding and other methods.

Through the design, regulation and modification of the framework materials and their pores, the strong interactions between the framework materials and the loaded guest molecules can be achieved, the loading capacity and efficiency of the chiral separation agent into porous framework materials can be improved, and the leakage of the chiral separation agent can be effectively reduced and prevented, so as to improve the separation effect and reusability of the chiral column. On the other hand, different from the traditional carrier materials (such as silica, agarose, etc.), porous framework materials have good crystallinity, determined structure and pore environment, which is convenient for the study and analysis of the interaction and related mechanism between the materials and their loaded chiral resolution agents, so as to continuously improve and optimize the performance of such CSP. In addition, porous framework materials have flexible components and diverse structures, and can be designed to introduce specific functional groups or structures in the materials according to the structure and properties of the selected chiral agents. Therefore, this versatile method can be used to design and prepare different types of CSPs as high-performance chiral chromatographic column packing to meet different separation needs, and thus has wide application value.

In view of these issues, the claimed invention and the preferred embodiments are proposed below.

OBJECTS AND SUMMARY OF THE INVENTION

Therefore, it is an object of the claimed invention to provide a significantly improved that utilizes porous framework materials (such as metal organic frameworks, MOFs; covalent organic frameworks, COFs; hydrogen bonded organic frameworks, HOFs) as the carrier, and carrying all kinds of chiral resolution agents (such as protein, enzyme, macrocyclic antibiotic) by means of chemical bonding, adsorption, embedding and cross-linking to prepare a new type of high-performance stationary phase for chiral chromatography.

In a first aspect, a novel type of chiral stationary phase includes porous framework materials and biomolecules, the porous framework materials serve as solid carriers, the biomolecules serve as chiral resolution agents, and the biomolecules are loaded into the porous framework materials.

Further, as described the porous framework materials can be any one or several combinations of metal organic frameworks (MOFs), covalent organic frameworks (COFs) and hydrogen bonded organic frameworks (HOFs).

Further, as described the biomolecules-chiral resolution agents can be proteins or macrocyclic antibiotics, wherein, the proteins can be any one or several combinations of lysozyme, bovine serum protein (BSA), cytochrome c, trypsin (trpsin), papain, pepsin and avidin; Macrocyclic antibiotics can be any one or several combinations of vancomycin, norvancomycin, avopasin, ristocin a, rifamycin B, teicoplanin, kanamycin, Freund's mycin and streptomycin.

Furthermore, the porous framework materials are modified with any one or several combinations of carboxyl, hydroxyl, amino, aldehyde, double bond and mercapto groups. And the pore size of porous framework material is 0.2-15 nm. The biomolecule chiral resolution agents have any one or several combinations of carboxyl, hydroxyl, amino and mercapto groups in the biomolecules-chiral resolution agents.

Furthermore, the methods of loading biomolecules into porous framework materials can be any one or their combination of covalent bond, adsorption method, embedding method and crosslinking method.

Further, the monolithic column or packing column of high-performance liquid chromatography, gas chromatography and capillary chromatography can be prepared by in-situ growth or direct filling.

Further, the novel chiral stationary phase can be applied to the separation of amino acids, drugs and organic small molecules under the conditions of reversed-phase chromatography, polar organic phase chromatography and normal chromatography.

Furthermore, MOFs can be PCN-777, PCN-600, PCN-333, PCN-222, MIL-101, MIL-100, ZIF-8, ZIF-90, ZPF-1, ZPF-2, TB-MOF; COFs can be PI—COF-1, PI—COF-2, PI—COF-3, COF-1, $COF_{TTA-DHTA}$, COF—$NH_2$, PTDB-$NH_2$, PTPA-$NH_2$, COF—OH, $[HOOC]_X$—COFs; HOFs can be HOF-1, HOF-2, HOF-3, HOF-4, HOF-5, HOF-6, HOF-7, MPM-1-Br.

Furthermore, the porous framework materials that loaded biomolecules using covalent method and cross-linking method can be one or several combinations of PI—COF-1, PI—COF-2, PI—COF-3, COF-1, $COF_{TTA-DHTA}$, COF—$NH_2$, PTDB-$NH_2$, PTPA-$NH_2$, COF—OH, $[HOOC]_X$—COFs; the porous framework materials that loaded biomolecules using embedding method and adsorption method can be one or several combinations of TTA-COF, PCN-777, PCN-600, PCN-333, PCN-222, MIL-101, MIL-100, ZIF-8, ZIF-90, ZPF-1, ZPF-2, TB-MOF, HOF-L HOF-2, HOF-3, HOF-4, HOF-5, HOF-6, HOF-7 and MPM-1-Br.

Covalent organic frameworks (COFs) are organic porous materials with ordered structure formed by covalent bonding of organic building units. They have the characteristics of high surface area, high porosity, regular pore size and easy to control, flexible structure, easy to function, and excellent thermal and chemical stability.

Hydrogen bonded organic frameworks (HOFs) are organic porous materials with ordered structure formed by organic building units (ligands) connected by hydrogen bonds. HOFs have the characteristics of high surface area, regular pore size and easy to control, flexible structure and so on. Both COFs and HOFs can be designed and synthesized as carrier materials with appropriate pore size and shape, high specific surface area and good thermal and solvent stability according to the application needs.

Metal-organic frameworks (MOFs) are synthesized by metal ions (or metal clusters) and organic ligands with specific functional groups and shapes. Therefore, MOFs with appropriate pore size and shape, high specific surface area and high pore rate and good thermal and solvent stability can be designed and synthesized according to needs.

Preferably, the porous framework materials were selected as the matrix to support the chiral resolution agents. According to the size of the selected resolution agent, the suitable organic ligands can be designed and synthesized to prepare the porous materials with the pore size matching the resolution agent size, which can not only ensure the loading efficiency of the materials for the resolution agents, but also ensure that the chiral resolution agents can enter the material pore rather than adhere to the material surface (the resolution agents are usually supported on the surface of the substrate in traditional chiral stationary phase). Thus, the stability of the chiral resolution agent is significantly improved, the leakage of the chiral resolution agent is reduced and avoided, and the durability of the chiral column is further improved.

Preferably, based on porous framework materials with multiple topological structures, we can design suitable pore size and shape (such as the structure of polyhedral cage structure, which has large cavities and smaller windows, and is not easily leaked and lost in the chiral splitter encapsulated in the material) to carry out the immobilization of chiral resolution agents. For example, through the performance optimization and comparison of materials with different pore characteristics, we selected a variety of metal organic framework materials with different pore types to adsorb and embed chiral resolution agents, such as PCN-777, PCN-600, PCN-333, PCN-222, MIL-101, MIL-100, ZIF-8, Tb-MOF, etc., so as to achieve the efficient preparation of multi-mode chiral stationary phase.

Preferably, due to porous framework materials (such as COFs, MOFs, etc.) have very high surface area and high pore rate, they possess high loading capacity. The amount of chiral resolution agent that can be loaded per unit mass of porous framework materials is much higher than that of other or traditional carriers, so the porous framework materials can be used for high-efficiency loading of chiral resolution agents to prepare high-efficiency chiral stationary phase (CSP).

Preferably, due to the diversity of the synthetic methods of porous framework materials (e.g. solvothermal synthesis, grinding, microwave synthesis, room temperature static method, etc.), porous framework materials can be used to load guest chiral selectors in various ways. For the chiral separation agents with different structural characteristics, we choose appropriate immobilization methods (such as chemical bond method, adsorption method, embedding method, cross-linking method, etc.) to achieve high-efficiency loading, reduce and avoid the structural denaturation and activity loss of the chiral separation agent in the loading process, and improve the loading rate of the chiral separation agent, so as to improve the efficiency of chiral separation.

Preferably, by analyzing the structural characteristics of the chiral resolution agent, we design and synthesize the building monomers with different functions, and obtain the porous framework material (i.e. "bottom-up" construction strategy) which has specific effect on the resolution agent, or to post-modify and react with the functional groups of the materials, so as to realize the covalent combination of the chiral resolution agent and the framework material. It can realize the chemical bond loading of various chiral separation agents, thus broaden the application scope of chiral separation column, greatly reduce and avoid the leakage of the resolution agent.

Preferably, because some framework materials can be synthesized under mild conditions, we can realize the high-efficiency embedding of the chiral separation agent and ensure its separation activity by "one pot method" (such as adding metal salt, ligand and chiral separation agent into the solvent at the same time), so as to improve the efficiency of chiral separation.

Preferably, based on the fact that organic ligands serve as the building blocks of porous framework materials, when the organic ligands of the materials contain more functional groups such as —OH, —NH$_2$, —OCH$_3$ or functional groups (such as benzene ring, nitrogen heterocycle, etc.) that could generate π-π interaction and electrostatic interaction with the guest molecules, porous framework materials can increase the loading efficiency of chiral resolution agent and slow down its leakage and loss through the interaction between porous framework materials and guest molecules. In addition, the porous framework materials have the characteristics of low density and uniform material particle size, so the filled chiral column has the characteristics of good permeability, uniform and stable column pressure, good column efficiency repeatability, and high batch stability.

Preferably, based on the knowability of porous framework materials' structure, we can realize its controllable synthesis. After a long-term experiment, we modified some porous framework materials (such as PICOF-1, PICOF-2, PICOF-3, COF-1, PCN-333, PCN-777, MIL-100) by group modification or metal exchange, and obtained new structures with significantly improved stability under heat or solvent treatment (methanol, ethanol, tetrahydrofuran, ethyl wax, acetone, dichloromethane and other organic solvents, various acidic and alkaline buffer solutions, hot water and other solutions). Therefore, the final prepared chiral stationary phase is suitable for both the normal phase mode and the reverse phase mode, which greatly broadens the scope of the separable substrate and the applicability of such technology.

Preferably, we use proteins as chiral resolution agents. Protein is a kind of complex biological macromolecule that composed of a variety of L-amino acids. Its three-dimensional structure and chiral group sites can participate in the enantioselectivity. Therefore, protein CSPs is one of the most widely used stationary phases for enantio-separation. Among of them, several protein CSPs, including bovine serum albumin (BSA) CSP, human serum albumin (HSA) CSP, α-acid glycoprotein (AGP) CSP, ovalbumin (OVM) CSP, pepsin CSP and cellulose hydrolase CSP, have been commercialized. However, there are still some problems, such as small sample volume and poor stability, in these CSPs. We creatively use porous framework materials as carriers to immobilize lysozyme, BSA, cytochrome c, trpsin, papain, pepsin, avidin and other proteins with chiral resolution effects to prepare chiral columns, which greatly improves the chromatographic separation efficiency, prolongs the service life (for example, column efficiency did not decrease significantly after continuous use for more than 3 months) and extremely reduce the difference between batches.

Preferably, because macrocyclic antibiotics have a variety of functional groups, asymmetric centers, and hole structures (glycopeptide type), they can interact with the separated substances in many ways, such as π-π interaction, hydrogen bonding, hydrophobic interaction, steric exclusion, van der Waals force, etc. Therefore, the macrocyclic antibiotics stationary phase (especially glycopeptide antibiotics) has the advantages of wide application, high separation efficiency and large sample loads and so on. In this invention, macrocyclic glycopeptide antibiotics such as vancomycin, norvancomycin, avopasin, ristocin a, rifamycin B, teicoplanin, kanamycin, Freund's mycin, streptomycin are selected as chiral resolution agents, and the framework materials are used to carry out the loading of these antibiotics, the antibiotic based chiral column is prepared, which greatly improves the chromatographic separation efficiency and prolongs its service life.

Preferably, except hydrophobic sites, proteins and macrocyclic antibiotics, usually have hydrophilic groups and ionizable groups, so they are amphiphilic molecules. Therefore, protein CSP and macrocyclic antibiotic CSP are suitable for both reverse phase chromatography and positive phase chromatography. Moreover, all of them have high enantioselectivity and show a wide range of chiral recognition ability. Taking lysozyme CSP as an example, it can be used to separate acidic chiral substances (such as tryptophan, leucine, threonine, etc.), alkaline chiral substances (such as chlorpheniramine), and neutral chiral substances (such as benzoin). And all kinds of enantiomers have high selectivity factor (α) and resolution ($R_S$), that is to say, they can completely and effectively separate many kinds of chiral substances.

At present, there is no universal chiral column similar to octadecylsilane bonded silica gel column (ODS), and the commercially available chiral columns are usually expensive and have very limited service time. The invention develops a preparation method of chiral stationary phase using porous framework material as carrier, and the obtained CSPs are used as high-performance chiral chromatographic column packing. The chiral stationary phase prepared by the method has strong durability, good stability, wide pH and solvent compatibility (buffer solution, ethanol, methanol isopropanol, acetone, dichloromethane, n-hexane, etc.) and can be applied in many chromatographic separation modes. At the same time, the structure and pore channel of porous framework material can be designed and adjusted, which can be used to load various types of chiral resolution agents; moreover, the synthesis method of porous framework material is simple, the reaction conditions are mild, and the reproducibility is good; because of the high surface area and high porosity of porous framework materials, the loading of chiral resolution agent is high, and the loading amount can be controlled by adjusting the material structure. In addition, the cost of material synthesis is relatively low, and the selected chiral resolution agent is common protein and macrocyclic antibiotic, so the preparation cost of the overall chromatographic column is low.

At present, cellulose derivative chiral column Cellu-D and amylose derivative Amy-D are only suitable for normal phase chromatography; Cellu-DR and Amy-DR are suitable for polar organic phase and reversed phase chromatography, and owing to the coated chiral separation agents are easy to lose, they are not suitable for changing mobile phase repeatedly. However, the chiral stationary phase prepared by the present application is widely applicable to various chromatographic conditions due to its amphiphilic and deionization of the chiral resolution agent and the designability of porous framework materials, and the chiral resolution agent is firmly fixed, which can maintain its separation effect under the condition of repeatedly replacing the mobile phase. In addition, the solid matrix of the chiral column on the market is generally silicon sphere. Because the silicon sphere is sensitive to strong acid and alkali, its use pH is limited and the range is 4-9. However, due to the stability of the porous framework materials, the chiral stationary phase prepared by the method of this application can be applied in the condition with a pH range of 2-12.

Various other objects, advantages and features of the present invention will become readily apparent from the ensuing detailed description, and the novel features will be particularly pointed out in the appended claims.

BRIEF DESCRIPTION OF FIGURES

The following detailed descriptions, given by way of example, and not intended to limit the present invention solely thereto, will be best be understood in conjunction with the accompanying figures.

DETAILED DESCRIPTION OF THE EMBODIMENTS

Referring to FIG. 1-FIG. 11, the synthesis of porous framework materials, characterization test of various properties and loading method of chiral resolution agent are as follows.

Embodiments 1-8 are the loading of biomolecules into porous framework materials.

Embodiment 1: The Synthesis of Covalent Organic Framework COF-1 that Used for Covalent Bonded Chiral Resolution Agents, the Specific Steps are as Follows The ligands 1,3,5-tris-(4-aminobenzene) triazine (TAPT 0.10 mmol) and pyromellitic acid tincture (PMDA 0.15 mmol) were added to the thick wall glass tube (O.D.× I.D=10×8 mm$^2$), then 0.5 mL mesitylene, 0.5 mL N-methylpyrrolidone and 0.05 mL isoquinoline were added, frozen rapidly in liquid nitrogen, vacuumized, and then sealed with hydrogen oxygen machine flame. The sealed glass tube was put into an oven at 200° C. for 5 days to react, and then yellow solid product COF-1 was obtained.

Solvent Activation of Porous Framework Material COF-1:

The obtained solid was washed several times with anhydrous tetrahydrofuran, until the supernatant was colorless. Then 100 mL anhydrous tetrahydrofuran was used as solvent of Soxhlet extraction for 24 hours, and the yellow solid was activated at 80° C. under vacuum for 8 hours, and then the product was stored in the glove box for the next experimental operation.

Embodiment 2: Covalent Organic Framework COF-1 as Carrier for Covalent Immobilization of Enzyme Activation of Carboxylic Acids in Covalent Organic Framework COF-1.

Weigh 10 mg of COF-1 to 20 mL of glass reaction bottle, add 5 mL of MES buffer solution containing equal amount of EDC and NHS, shake in the shaker at room temperature for 2 hours, then filter out COF-1, and wash 3-5 times with 5 ml of MES buffer solution of 0.1M pH 6.0, and then dry at room temperature.

Covalent Immobilization of Enzyme on Activated COF-1.

Figure 1:
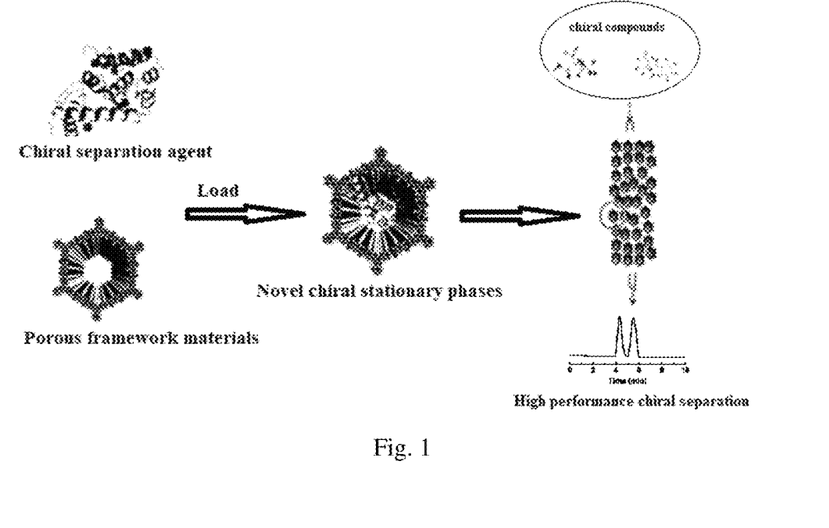
FIG. 1 is schematic diagram of chiral stationary phase for chiral separation with porous framework material as support for chiral separation agent.
Figure 2:
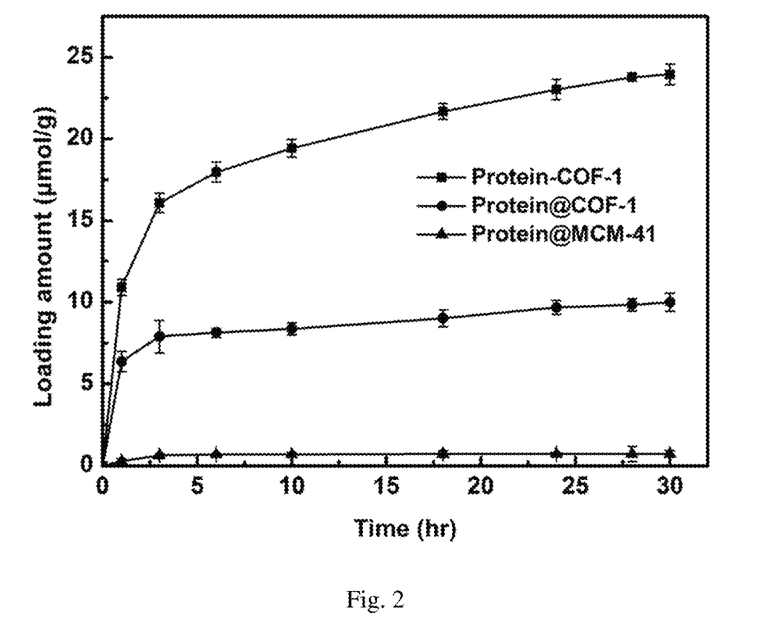
FIG. 2 is the covalent and adsorption curve of enzyme chiral resolution agents immobilized into COF-1, and the adsorption curve of traditional material MCM-41 for enzyme chiral resolution agents (protein-COF-1 means the protein is covalently fixed to COF-1; protein @ COF-1 means protein is adsorbed fixed to COF-1; protein @ MCM-41 means protein is adsorbed fixed to MCM-41)

Weigh 10 mg activated COF-1, add into 20 mL glass reaction flask, then add 2 mL of MES buffer solution containing 3 mg/mL of enzyme to the vial, shake in the shaker at 37° C. As shown in FIG. 1, the ultraviolet absorption of supernatant is tested every other period of time to calculate the amount of enzyme loaded on the material, and the covalent immobilization curve of enzyme into COF-1 is drawn. FIG. 2 is the final loading amount of enzyme on the material after 24 hours.

In FIG. 1 and FIG. 2, the adsorption process of enzyme into porous framework material COF-1 and traditional material MCM-41 is as follows:

Weigh 10 mg of COF-1 and MCM-41 respectively, directly add 2 mL of MES buffer solution of 0.1 M, pH 7.0 containing 3 mg/mL of enzyme, shake it in a shaker at 37° C., as shown in FIG. 1, like COF-1 covalent immobilized enzyme, test the ultraviolet absorption of the supernatant at intervals to calculate the amount of enzyme adsorbed by each material.

Embodiment 3: Covalent Immobilization of Vancomycin with Covalent Organic Framework COF-1 as Carrier Covalent Immobilization of Vancomycin on Activated COF-1.

Figure 3:
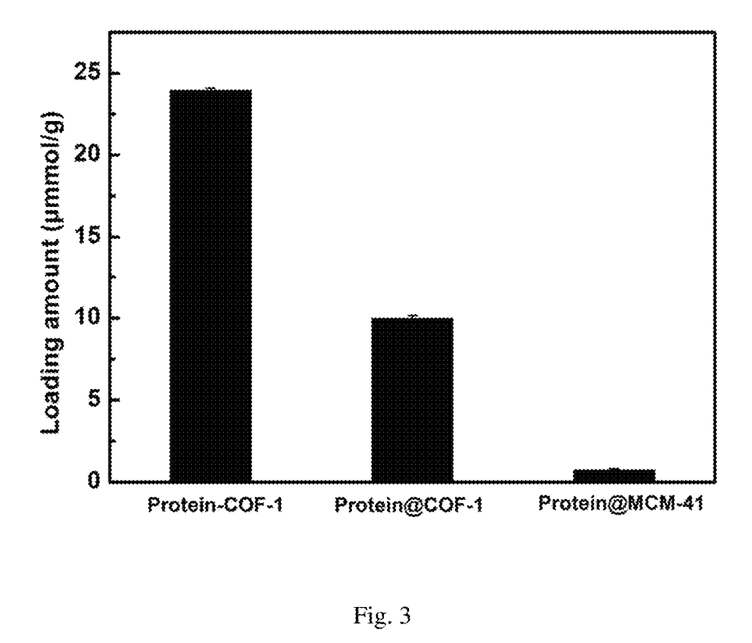
FIG. 3 is the data diagram of the final loading amount of enzyme chiral resolution agents in various materials after 24 hours (protein-COF-1 means the protein is covalently fixed to COF-1; protein @ COF-1 means protein is adsorbed fixed to COF-1; protein @ MCM-41 means protein is adsorbed fixed to MCM-41)

Weigh 5 mg of activated COF-1, add into 10 mL of centrifuged tube, then add 2 mL aqueous solution containing 5 mg/mL vancomycin to the centrifuged tube, shake it in a shaker at 37° C. As shown in FIG. 3, the ultraviolet absorption of supernatant is tested every time interval to calculate the vancomycin content loaded on the material, and the covalent immobilization curve of vancomycin by COF-1 is drawn.

Embodiment 4: The Synthesis of the Covalent Organic Framework $COF_{TTA\text{-}DHTA}$ The ligands TTA (0.05 mmol) and DHTA (0.075 mmol) were weighed respectively and added to the thick wall heat-resistant glass tube (O.D.×I.D=10×8 mm$^2$), then 0.5 mL mesitylene, 1 mL 1,4-dioxane and 0.1 mL 6 M acetic acid were added, frozen rapidly in liquid nitrogen, vacuumized, and then sealed with a hydrogen oxygen machine flame. The sealed glass tube was put into an oven at 120° C. for 3 days to react, and then red solid product $COF_{TTA\text{-}DHTA}$ was obtained.

Embodiment 5: The Crosslinking of Norvancomycin on Covalent Organic Framework $COF_{TTA\text{-}DHTA}$ The Activation of Covalent Organic Framework $COF_{TTA\text{-}DHTA}$.

Weigh 40 mg of $COF_{TTA\text{-}DHTA}$, and disperse it in 2 mL of tetrahydrofuran solution. Then add 40 mg of cyanuric chloride, and react at room temperature for 3 hours. After the reaction, the activated material is washed with tetrahydrofuran, ethanol and water for several times and dried.

The crosslinking of norvancomycin.

Figure 4:
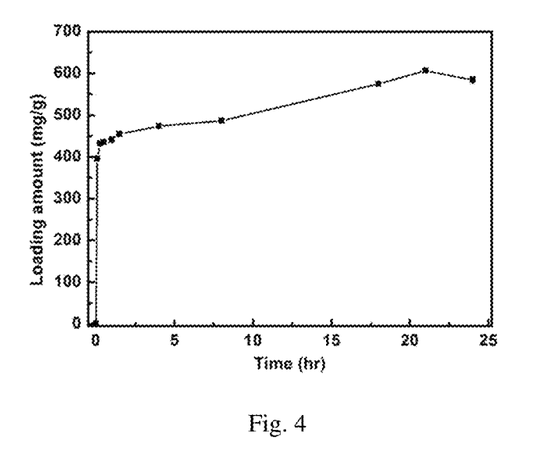
FIG. 4 is the covalent immobilization curve of vancomycin into covalent organic framework COF-1.

Weigh 5 mg of activated $COF_{TTA\text{-}DHTA}$, add into 10 mL centrifuge tube, then add 2 mL of aqueous solution containing 5 mg/mL norvancomycin to the centrifuge tube, shake it in the shaking table at 37° C. As shown in FIG. 4, the ultraviolet absorption of supernatant is tested every time interval to calculate the amount of norvancomycin loaded on the material, and the cross-linking fixed curve of norvancomycin into $COF_{TTA\text{-}DHTA}$ is drawn.

Embodiment 6: Adsorption Loading of Enzyme by Metal-Organic Framework

The Synthesis of Metal-Organic Framework.

Dissolve 50 mg of 4,4',4'-s-triazine-2,4,6-triphenic acid ($H_3TATB$) and 200 mg of $AlCl_3 \cdot 6H_2O$ into 10 mL N, N-dimethylformamide, and then add 1 mL of trifluoromethanesulfonic acid. Put the above mixture into the oven at 135° C. for 2 days to obtain white solid. The white precipitate was collected by centrifugation and washed several times with fresh N, N-dimethylformamide. Until the supernatant was colorless and the white product, PCN-333, was collected. Yield: 80%.

Adsorption Immobilization of Enzyme on Metal-Organic Framework.

Figure 5:
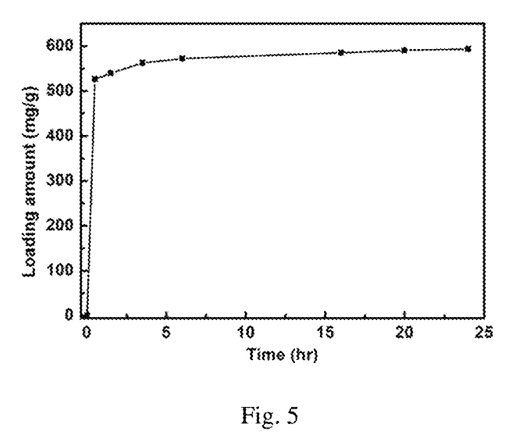
FIG. 5 is the cross linking curve of norvancomycin into covalent organic framework $COF_{TTA-DHTA}$.

Weigh 10 mg PCN-333, then add 2 mL of MES buffer solution containing 3 mg/mL of enzyme directly, shake in a shaker at 37° C., as shown in FIG. 5, test the ultraviolet absorption of the supernatant every other period of time to calculate the amount of enzyme adsorbed on the solid.

Embodiment 7: Embedding of Enzyme by Metal-Organic Framework

Weigh 5 mg of BSA, 1.552 g of 2-methylimidazole in 5.4 ml of deionized water, 80 mg of zinc nitrate hexahydrate in 0.6 ml of deionized water, mix the two solutions, react at 30° C. for 10 min to obtain BSA @ ZIF-8, and the entrapment rate of BSA is more than 90%.

Embodiment 8: Adsorption Immobilization of Vancomycin by Hydrogen Bonded Organic Framework The Synthesis of Hydrogen Bonded Organic Framework.

Weigh 11 mg of adenine to be dissolved in 12 ml of methanol, 8.8 mg of copper bromide to be dissolved in 12 ml of isopropanol, and add the methanol solution of adenine to the test tube, slowly drop the isopropanol solution of copper bromide to cover the methanol solution, and then allow the reaction to stand for one week at room temperature. The obtained material was washed several times with methanol to obtain MPM-1-Br.

Adsorption Immobilization of Vancomycin by Hydrogen Bonded Organic Framework

Figure 6:
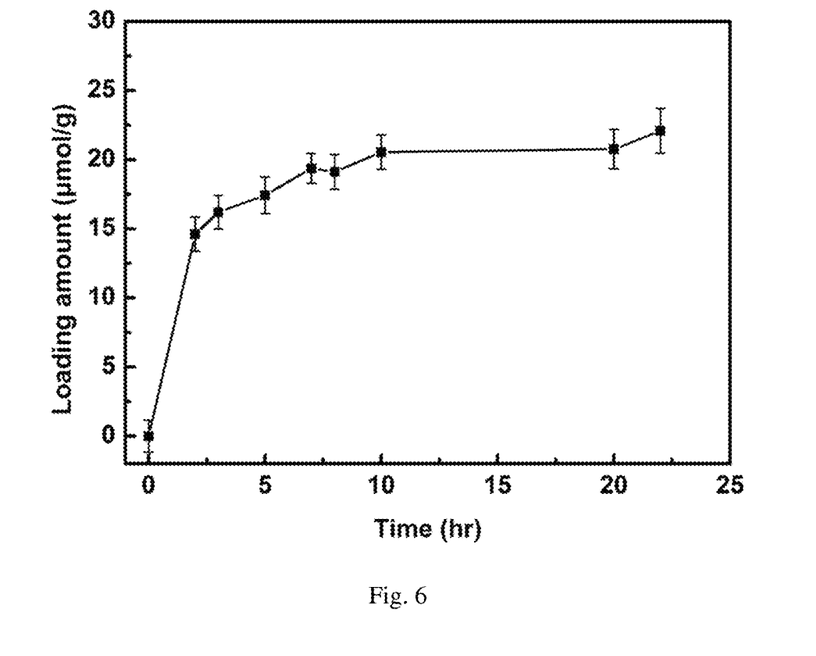
FIG. 6 is the adsorption curve of enzyme chiral resolution agents into metal-organic frameworks.
Figure 7:
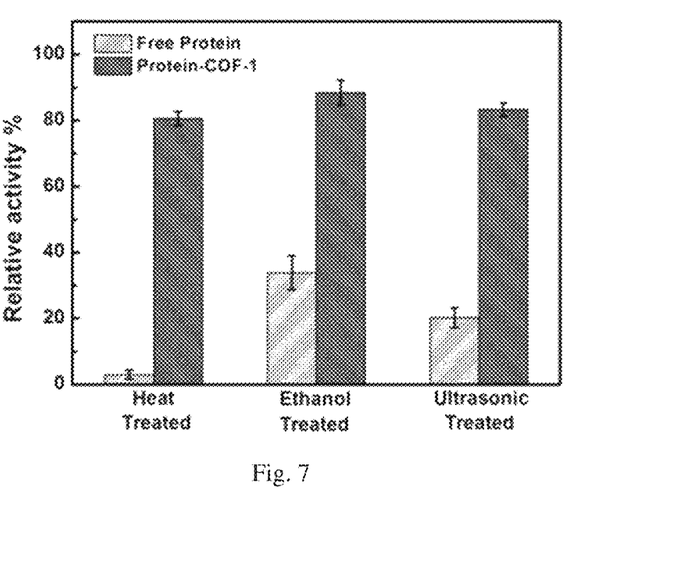
FIG. 7 is the thermal stability, solvent stability and mechanical stability of the enzyme after immobilization (the activity of free enzyme is 100%). In the figure, free protein refers to free enzyme and protein-COF-1 refers to the protein is covalently immobilized in COF-1.
Figure 8:
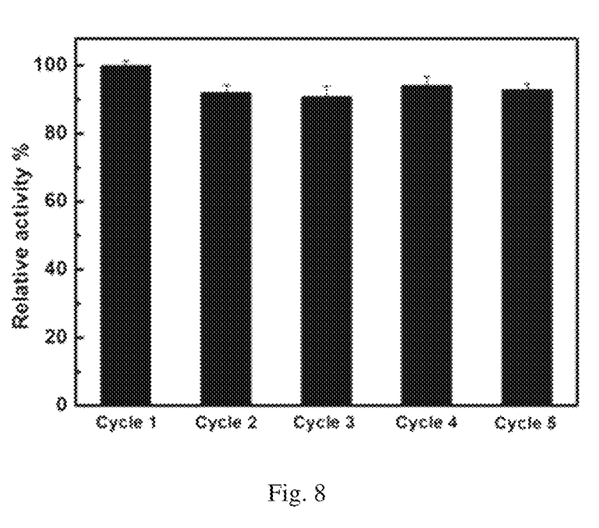
FIG. 8 is the data of 5 times of reuse of the enzyme after immobilization.
Figure 9:
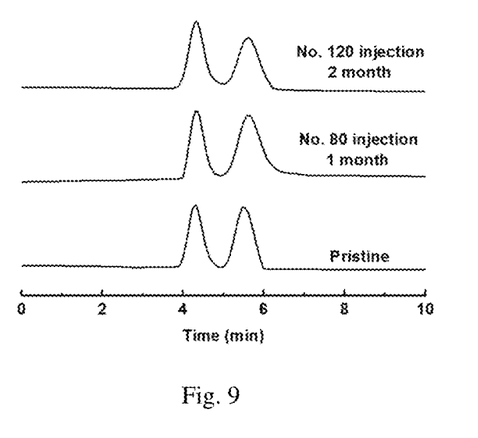
FIG. 9 is the resolution and repeated injection diagram of DL-threonioic acid on the chiral column that prepared with the enzyme loaded into COF material as the chiral stationary phase. Specification of chromatographic column: 100×4.6 mm (i.d.), mobile phase: pH 6.5 phosphoric acid buffer solution 98%/isopropanol 2%, flow rate: 0.5 mL/min, detection wavelength: 214 nm, temperature: 25° C.
Figure 10:
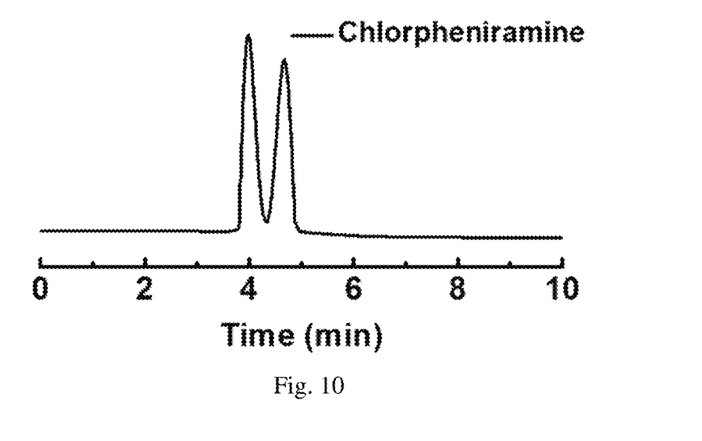
FIG. 10 is the resolution of chlorpheniramine on a chiral column that prepared with the enzyme loaded COF material as the chiral stationary phase. Specification of chromatographic column: 100×4.6 mm (i.d.), mobile phase: pH 6.5 phosphoric acid buffer solution 98%/isopropanol 2%, flow rate: 0.5 mL/min, detection wavelength: 214 nm, temperature: 25° C.
Figure 11:
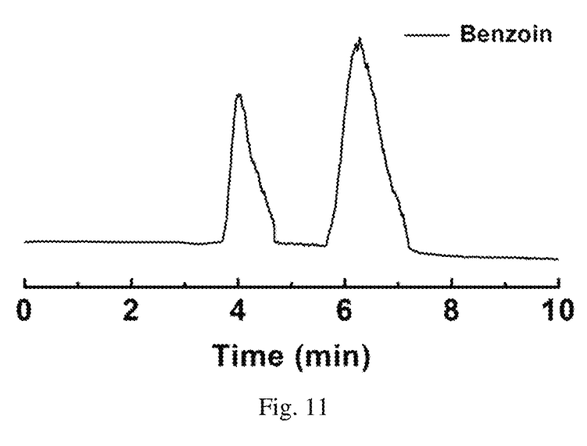
FIG. 11 is resolution of neutral benzoin drugs on a chiral column that prepared with enzyme loaded COF material as chiral stationary phase. Specification of chromatographic column: 100×4.6 mm (i.d.), mobile phase: methanol 80%/acetonitrile 20%, flow rate: 0.5 mL/min, detection wavelength: 214 nm, temperature: 25° C.

Weigh 5 mg of MPM-1-Br, add 2 mL water solution containing 5 mg/mL vancomycin directly, shake in the shaker at 37° C., as shown in FIG. 6, test the ultraviolet absorption of the supernatant every other period of time to calculate the amount of vancomycin adsorbed.

Embodiments 9-11 are stability tests of novel chiral stationary phases.

Embodiment 9: Stability Test Experiment of Novel Chiral Stationary Phase

Thermal Stability Test of Enzyme after Covalent Immobilization.

The covalent bonded enzyme and the same amount of free enzyme were simultaneously placed in an oven at 80° C. for 1 hour. After cooling, 150 µg/mL chitosan substrates were added respectively. After incubation at 50° C. for 30 minutes, the supernatant was filtered. The supernatant was reacted with the developer potassium iron dense for 15 minutes at 100° C., and then the reaction solution was tested at 420 nm. Compared with the activity of the immobilized enzyme and the free enzyme, the thermostability of the immobilized enzyme is improved significantly, which is still about 80% activity, while the free enzyme has no activity after heat treatment.

Solvent Stability Test of Enzyme after Covalent Immobilization.

The covalent bonded enzyme and the same amount of free enzyme were treated in methanol solution for one hour at the same time, and then the enzyme activity was tested according to the method of enzyme activity test in the heat stability test. The results showed that the immobilized enzyme' activity was still above 85% and the activity of free enzyme was below 40% after methanol treatment.

Mechanical stability test of enzyme after covalent immobilization.

The covalent bonded enzyme and the same amount of free enzyme were treated at the same time under the condition of ultrasonic 40 kHz for 30 min, and then the enzyme activity test was carried out according to the method of enzyme activity test under the condition of thermal stability test. The results showed that the immobilized enzyme activity was still above 90% and the activity of free enzyme was reduced to below 30% after treated with ultrasonic.

Reusability Test of Enzyme after Covalent Immobilization.

The results showed that the enzyme activity did not decrease significantly after five cycles.

All the above stability tests showed that the enzyme stability was significantly improved after covalent immobilization, so the chiral stationary phase prepared by this method had good stability and reusability.

Embodiment 10: The Preparation of the HPLC Chiral Stationary Phase with Porous Framework Material COF-1 as Carrier to Covalent Immobilize Enzyme According to the method of covalent immobilization of enzyme in embodiment 2, 1 g COF-1 was loaded with enzyme, and then freeze-dried. The prepared materials were added into 50 mL ethanol, dispersed by ultrasound for 10 min, and the uniform chiral stationary phase packing was loaded into the homogenate tube. Ethanol was used as the substitution liquid, and then pressed into the empty tube column of ferrule chromatography by pneumatic pump. The column specification is 100×4.6 mm (i.d.). The filling pressure is 5000 psi.

Preparation of Chiral Monolithic Capillary Column by In Situ Method:

5 m×0.32 mm capillary column was repeatedly washed and activated by 1 M sodium hydroxide, water, 0.1 M hydrochloric acid, water and methanol, then 50% 3-aminopropyltriethoxysilane was injected into the column and reacted at 40° C. for 10 hours to obtain amino activated capillary column. Dissolve 1,3,5-tris-(4-aminobenzene) triazine (0.1 mmol) and p-benzenedicaldehyde (0.15 mmol) in 0.4 mL mesitylene and 1.6 mL, 4-dioxane, add 5 mg BSA, pour the mixed solution into the capillary tube, and then add 0.4 mL 3.75 mg/mL trifluoromethylsulfonic acid solution, mix with ultrasound, and allow the reaction to stand for 30 minutes, At the end of the reaction, the Chiral Monolithic Capillary Column with BSA was obtained by repeatedly washing with methanol solution.

Embodiment 11: Preparation of Mobile Phase and Samples

Acid, alkaline and neutral samples were selected for the test. The sample was first prepared into 2 mg/mL by water or ethanol. Before the test, the sample was diluted to 20 μg/mL using mobile phase, and the injection volume was 10 μL.

Mobile phase: pH 6.5, 20 mM phosphoric acid buffer solution is prepared from disodium hydrogen phosphate and sodium dihydrogen phosphate, and then 2% isopropanol is added as the organic regulator, and filtrate with filter membrane (0.22 μm) before use; organic mobile phase: methanol, acetonitrile, ultrasonic for 30 minutes before use. The flow rate is 0.5 mL/min.

TABLE 1 separation results of chiral samples under reversed phase conditions.

| Sample | Retention time (t1/min) | retention time (t1/min) | Rs | α |
| --- | --- | --- | --- | --- |
| DL-Leucine | 4.32 | 5.61 | 1.42 | 1.15 |
| DL-Tryptophan | 4.35 | 5.65 | 1.41 | 1.29 |
| DL-Threonine | 4.30 | 5.63 | 1.43 | 1.31 |
| Chlorpheniramine | 3.97 | 4.69 | 1.64 | 1.18 |

Conclusion: from the results of separation in the above table, it can be seen that the chiral column has better separation efficiency of these acidic and alkaline samples in Table 1, and can be compared with the existing commercial chiral columns.

TABLE 2 separation results of chiral samples in polar organic phase.

| Sample | Retention time (t1/min) | retention time (t1/min) | Rs | α |
| --- | --- | --- | --- | --- |
| Benzoin 1 | 4.00 | 6.51 | 2.41 | 1.34 |
| Benzoin 2 | 4.70 | 10.86 | 3.71 | 1.57 |

Benzoin 1: acetonitrile 100%, flow rate 0.5 mL/min; Benzoin 2: methanol/acetonitrile, 80/20 (V/V), flow rate 0.5 mL/min.

Conclusion: it can be seen from the separation results in the above table that the chiral stationary phase has good separation efficiency on benzoin under the condition of polar organic phase.

TABLE 3 separation results of chiral samples in normal phase

| Sample | Retention time (t1/min) | retention time (t1/min) | Rs | α |
| --- | --- | --- | --- | --- |
| 1-phenyl-2-isopropanol | 24.5 | 32.1 | 1.78 | 1.29 |
| 1-phenyl-1-pentanol | 23.2 | 29.6 | 1.58 | 1.21 |

Specification of chromatographic column: 150×4.6 mm (i.d.), mobile phase: n-hexane 99%/isopropanol 1%, flow rate: 0.2 mL/min, detection wavelength: 214 nm, temperature: 25° C.

Conclusion: it can be seen from the separation results in the above table that the chiral stationary phase has a good separation effect on organic small molecules under the condition of normal phase.

TABLE 4 repeatability of the chiral column

| | Reinjection (8) | Day-to-Day | Column-to-Column |
| --- | --- | --- | --- |
| Relative standard deviation (RSD %) | 0.068 | 0.14 | 0.12 |

Conclusion: from the data in Table 4, it can be concluded that the stability and reusability of the chiral column are very good, and the difference between different batches is small.

Embodiment 12: Commercial Cost of the Chiral Column with Enzyme and Macrocyclic Antibiotic as Chiral Resolution Agent and Covalent Organic Framework as Carrier The production of a 4.6×100 mm enzyme immobilized chiral column requires the material (COF-1) with chiral resolution agent 0.8 g, and the cost is:

| Material cost: 187 CNY | | | | |
|---|---|---|---|---|
| Empty Column | Aminobenzonitrile | Benzenetetracarboxylic anhydride | TfOH | Lysozyme |
| 180 CNY | 1000 CNY/Kg | 260 CNY/Kg | 900 CNY/Kg | 450 CNY/100 g |
| 180 CNY | 0.8 CNY/800 mg | 0.169 CNY/650 mg | 3.6 CNY/4 g | 2.25 CNY/0.5 g |
| Salary Cost: Material synthesis personnel 1 person × 3 days = 600 CNY(Calculated according to the average wage of graduate staff of per present) Environmental costs: 27 CNY | | | | |
| Triethylbenzene | isoquinoline | N-methylpyrrolidone | Tetrahydrofuran | Ethanol |
| 880 CNY/2.5 L | 330 CNY/Kg | 277 CNY/2.5 L | 340 CNY/10 L | 10 CNY/L |
| 3.52 CNY/10 mL | 0.33 CNY/1 mL | 1.1 CNY/10 mL | 17 CNY/500 mL | 5 CNY/500 mL |
| Total: 814 CNY | | | | |

At present, the price of imported Daicel enzyme immobilized chiral column with the same specification on the market is 14000-16000 CNY; the price of domestic chiral column with the same specification on the market is 12000 CNY. The cost of preparing an enzyme based chiral column by the method of this application is only 814 CNY.

Having described at least one of the embodiments of the claimed invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. Specifically, one or more limitations recited throughout the specification can be combined in any level of details to the extent they are described to improve the invention.

What is claimed is:

1. A chiral stationary phase, comprising porous framework materials and biomolecules, wherein:
   the porous framework materials include at least one of metal-organic framework materials (MOFs), covalent organic framework materials (COFs) and hydrogen-bonded organic framework materials (HOFs);
   the biomolecules are biological chiral resolving agents;
   a pore size of the porous framework materials is 0.2-15 nm;
   the porous framework materials serve as solid carrier;
   the biomolecules are loaded into the porous framework materials; and
   the porous framework materials are modified with one or more of carboxyl, hydroxyl, amino, aldehyde, double bonds and mercapto groups.

2. The chiral stationary phase in claim 1, wherein the biomolecules have one or more of carboxyl, hydroxyl, amino and mercapto groups.

3. The chiral stationary phase in claim 2, wherein the porous framework materials are modified with one or more of carboxyl, hydroxyl, amino, aldehyde, double bonds and mercapto groups.

4. The chiral stationary phase in claim 1, wherein the biological chiral resolving agents are one of chiral proteins and chiral macrocyclic antibiotics.

5. The chiral stationary phase in claim 4, wherein the porous framework materials are modified with one or more of carboxyl, hydroxyl, amino, aldehyde, double bonds and mercapto groups.

6. The chiral stationary phase in claim 4, wherein:
   the chiral proteins are one or more of lysozyme, bovine serum albumin (BSA), cytochrome C, trypsin, papain, pepsin and avidin; and
   the chiral macrocyclic antibiotics are one or more of vancomycin, norvancomycin, avoparcin, ristocetin A, rifamycin B, teicoplanin, kanamycin, fradiomycin and streptomycin.

7. The chiral stationary phase in claim 6, wherein the porous framework materials are modified with one or more of carboxyl, hydroxyl, amino, aldehyde, double bonds and mercapto groups.

8. The chiral stationary phase in claim 1, wherein:
   the metal-organic frameworks (MOFs) are one of PCN-777, PCN-600, PCN-333, PCN-222, MIL-101, MIL-100, ZIF-8, ZIF-90, ZPF-1, ZPF-2 and Tb-MOF;
   the covalent organic frameworks (COFs) are one of PICOF-1, PICOF-2, PICOF-3, COF-1, $COF_{TTA-DHTA}$, COF—$NH_2$, PTDB-$NH_2$, PTPA-$NH_2$, COF—OH and [HOOC]X—COFs; and
   the hydrogen bonded organic frameworks (HOFs) are one of HOF-1, HOF-2, HOF-3, HOF-4, HOF-5, HOF-6, HOF-7 and MPM-1-Br.

9. The chiral stationary phase in claim 2, wherein:
   the metal-organic frameworks (MOFs) are one of PCN-777, PCN-600, PCN-333, PCN-222, MIL-101, MIL-100, ZIF-8, ZIF-90, ZPF-1, ZPF-2 and Tb-MOF;
   the covalent organic frameworks (COFs) are one of PICOF-1, PICOF-2, PICOF-3, COF-1, $COF_{TTA-DHTA}$, COF—$NH_2$, PTDB-$NH_2$, PTPA-$NH_2$, COF—OH and [HOOC]X—COFs; and
   the hydrogen bonded organic frameworks (HOFs) are one of HOF-1, HOF-2, HOF-3, HOF-4, HOF-5, HOF-6, HOF-7 and MPM-1-Br.

10. The chiral stationary phase in claim 6, wherein:
    the metal-organic frameworks (MOFs) are one of PCN-777, PCN-600, PCN-333, PCN-222, MIL-101, MIL-100, ZIF-8, ZIF-90, ZPF-1, ZPF-2 and Tb-MOF;
    the covalent organic frameworks (COFs) are one of PICOF-1, PICOF-2, PICOF-3, COF-1, $COF_{TTA-DHTA}$, COF—$NH_2$, PTDB-$NH_2$, PTPA-$NH_2$, COF—OH and [HOOC]X—COFs; and the hydrogen bonded organic frameworks (HOFs) are one of HOF-1, HOF-2, HOF-3, HOF-4, HOF-5, HOF-6, HOF-7 and MPM-1-Br.

11. The chiral stationary phase in claim 1, wherein:

the metal-organic frameworks (MOFs) are one of PCN-777, PCN-600, PCN-333, PCN-222, MIL-101, MIL-100, ZIF-8, ZIF-90, ZPF-1, ZPF-2 and Tb-MOF;

the covalent organic frameworks (COFs) are one of PICOF-1, PICOF-2, PICOF-3, COF-1, COFTTA-DHTA, COF—$NH_2$, PTDB-$NH_2$, PTPA-$NH_2$, COF—OH and [HOOC]X—COFs;

the hydrogen bonded organic frameworks (HOFs) are one of HOF-1, HOF-2, HOF-3, HOF-4, HOF-5, HOF-6, HOF-7 and MPM-1-Br;

the chiral proteins are one or more of lysozyme, bovine serum albumin (BSA), cytochrome C, trypsin, papain, pepsin and avidin; and the chiral macrocyclic antibiotics are one or more of vancomycin, norvancomycin, avoparcin, ristocetin A, rifamycin B, teicoplanin, kanamycin, fradiomycin and streptomycin.

\* \* \* \* \*